United States Patent [19]

Ishibai

[11] Patent Number: 4,776,101
[45] Date of Patent: Oct. 11, 1988

[54] METHOD AND APPARATUS FOR TESTING ASPHERICAL LENSES

[75] Inventor: Isao Ishibai, Tokyo, Japan

[73] Assignee: Hoya Corporation, Tokyo, Japan

[21] Appl. No.: 120,756

[22] Filed: Nov. 10, 1987

Related U.S. Application Data

[63] Continuation of Ser. No. 765,503, Aug. 14, 1985, abandoned.

[30] Foreign Application Priority Data

Sep. 14, 1984 [JP] Japan .................. 59-191767

[51] Int. Cl.$^4$ .............................................. G01B 7/28
[52] U.S. Cl. .................................. 33/551; 33/507
[58] Field of Search .......... 33/507, 550, 545, 551–558, 33/568, 573, 543, 572, DIG. 21

[56] References Cited

U.S. PATENT DOCUMENTS

| 3,615,143 | 10/1971 | Barr et al. ........................... 33/505 |
| 4,070,762 | 1/1978 | Siddall ............................. 33/550 X |
| 4,151,654 | 5/1979 | Hashimoto .......................... 33/507 |

FOREIGN PATENT DOCUMENTS 1230164   3/1960   France .................................. 33/558

Primary Examiner—Harry N. Haroian
Attorney, Agent, or Firm—Cushman, Darby & Cushman

[57] ABSTRACT

To test an aspheric lens, the lens is mounted on a base shaft having a central axis so that the center of a reference curvature radius of the lens agrees with a central axis of the base shaft. A stylus mounted on a rotary table is rotated about the lens such that its center of rotation lies on the central axis. The step of stylus is maintained in contact with the surface of the aspherical lens. As the stylus is rotated in contact with the lens, both the rotational and radial position of this stylus is monitored.

6 Claims, 1 Drawing Sheet

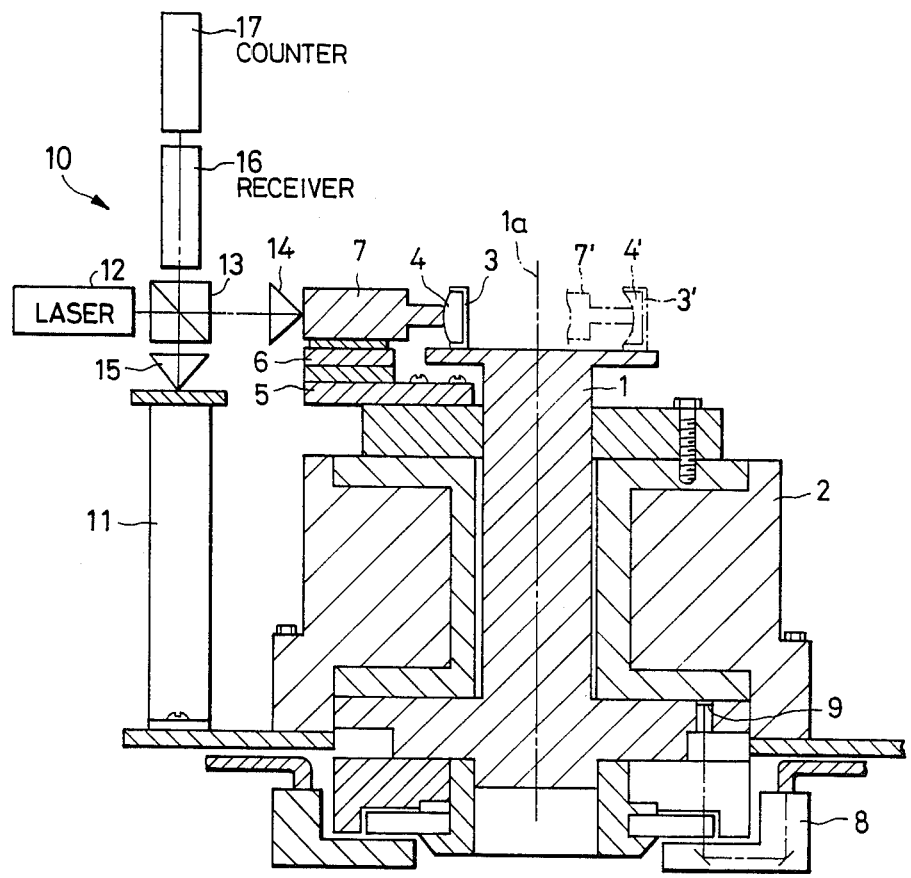

METHOD AND APPARATUS FOR TESTING ASPHERICAL LENSES

This is a continuation of application Ser. No. 765,503 filed Aug. 14, 1985 which was abandoned upon the filing hereof.

BACKGROUND OF THE INVENTION

1. Field of the Invention

The present invention relates to methods and devices for testing the aspheric profile of an aspheric lens.

2. Description of the Prior Art

Recently, attempts have been made to use aspheric lenses in various optical devices to solve a problem to aberration peculiar to a spherical face. It thus becomes necessary to test a manufactured aspheric lens to see whether the lens has the aspheric profile as designed.

Various testing devices using a stylus have been proposed. In such devices the stylus contacts a surface of an aspheric lens. Although the stylus cannot rotate, it can slide toward and away from the lens. The aspherical lens is rotated about an axis passing through the center of a reference curvature radius of the lens. The aspheric profile is tested by the amount of displacement of the stylus which is displaced in the radial direction of the aspheric lens in response to the rotation of the aspheric lens.

In such a conventional device, however, a rotary shaft on which an aspheric lens is mounted and an attachment member on which a stylus is attached are separate members having no correlation therebetween. Therefore, errors associated with the aspheric lens, such as a positioning error relative to the rotary shaft, and errors associated with the stylus, such as a positioning error relative to the attachment member, are caused independently on each other. As a result, these factors may compound to produce a large error as a whole, so that it is difficult to reproduce test results. Further, the diameter of the rotary shaft is not so large and therefore an angular error in rotating the aspheric lens as well as an angular error in measuring the amount of rotation of the aspheric lens unavoidably become considerable values, making it nearly impossible to obtain accurate test results.

SUMMARY OF THE INVENTION

An object of the present invention is to solve the problems in the prior art by providing a method and apparatus for accurately testing an aspheric lens by suppressing various errors to the minimum.

In order to attain the above-mentioned object, according to the present invention, an aspheric lens is mounted on base shaft such that the center of a reference curvature radius agrees with the center axis of the shaft. A stylus is attached to a rotary table provided rotatably around the base shaft and about the central axis of the shaft. The stylus is brought into contact with a surface of the aspheric lens, and the rotary table is rotated so as to test an aspheric shape of the aspherical lens by means of the stylus.

According to the present invention, the rotary table on which the stylus is attached rotates about the central axis of the base shaft on which an aspheric lens is mounted. Therefore errors associated with the aspheric lens and errors associated with the stylus are correlated so as to minimize total error. As a result testing becomes more reproducible. Further, since the diameter of the rotary table is larger than that of the base shaft, the angular error in rotating the stylus as well as the angular error in measuring the amount of rotation of the stylus can also be minimized, thereby enabling testing to be performed correctly.

BRIEF DESCRIPTION OF THE DRAWING

These and other objects and advantages of this invention will become more apparent and more readily appreciated from the following detailed description of the presently preferred exemplary embodiment, taking in conjunction with the accompanying drawing which is a cross-elevational view of a casting apparatus according to the present invention.

DETAILED DESCRIPTION OF THE PRESENTLY PREFERRED EXEMPLARY EMBODIMENT

The drawing shows a embodiment of the present invention, in which a base shaft 1, having a circular cross-section, rotates about a vertical control axis 1a. A rotary table 2 completely surrounds base shaft 1 and is arranged to be rotatable about axis 1a. Compressed air is blown into a fine gap between base shaft 1 and rotary table 2 to maintain the center of rotation of rotary table 2 at central axis 1a. An aspheric lens 4 is mounted on base shaft 1 through a lens mount 3 such that the center of the reference curvature radius of lens 4 lies along central axis 1a. A stylus 7 is attached to rotary table 2 through a stylus mount 5 and an X-Y stage 6 such that the stylus 7 comes in contact with the surface of aspheric lens 4. A rotary encoder 8 is arranged under rotary table 2 to read out a scale 9 provided at the bottom portion of rotary table 2 to measure the amount of rotation of rotary table 2 when rotary table 2 is rotated by a driving member (not shown).

A well-known laser interference length measuring instrument 10 is arranged behind stylus 7 and is attached to a support 11 which rotates with rotary table 2. Length measuring instrument 10 includes a laser light source 12, a half mirror 13, prisms 14 and 15, a light receiver 16, and a counter 17.

When rotary table 2 is rotated, stylus 7 is displaced in the radial direction of aspheric lens 4 to a degree corresponding to the aspheric shape of lens 4 while scanning its surface along a horizontal plane. The amount of scanning by stylus 7, that is, the amount of rotation of rotary table 2, is measured by rotary encoder 8. At the same time, the degree of displacement of stylus 7 is measured by counter 17. Some of the light emitted from laser light source 12 forms a measurement beam which passes through half mirror 13 and is reflected at prism 14. The measurement beam then enters light receiver 16. The rest of the light emitted from laser light source 12 forms a reference beam which is reflected by half mirror 13 and is reflected at prism 15. The reference beam then also enters light receiver 16. The reference beam interferes with the measurement beam and counter 17 counts the interference patterns representing changes in position of stylus 7. As a result the shape of aspherical lens 4 is tested on the basis of the measured value of the amount of rotation as well as the measured value of the amount of displacement.

Stylus 7 is rotated within a horizontal plane and is always horizontally in contact with aspherical lens 4. Therefore the weight of stylus 7 itself neither affects the measurement of the amount of displacement, nor injures the surface of aspherical lens 4.

Further, although a convex lens is shown by way of example as aspherical lens 4 in the above embodiment, the embodiment can be also be used with a concave lens. In that case, as shown by a one-dotted chain line in the drawing, the device may be arranged such that a lens mount 3' is disposed at a position where the center of a reference curvature radius of an aspherical lens 4' coincides with central axis 1a, and a stylus 7' is extended to come in contact with the surface of aspherical lens 4'.

According to the present invention the surface of an aspheric lens may be tested with errors resulting from the aspheric lens being related to errors resulting from the stylus to thereby make it possible to minimize the total error, whereby, especially, reproducibility can be improved. Since the rotary table has a diameter larger than that of a base shaft which corresponds to the conventional rotary shaft, on which an aspheric lens is mounted, the angular error in rotating the stylus and the angular error in measuring the amount of rotation of the stylus can be suppressed to the minimum to thereby make it possible to correctly test the shape of the aspheric lens with various errors minimized.

Although only a single embodiment of the present invention has been described in detail above, those skilled in the art will readily appreciate that many modifications are possible in the preferred embodiment without materially departing from the novel teachings and advantages of this invention. Accordingly, all such modifications are intended to be included in the scope of the following claims.

What is claimed is:

1. Apparatus for testing aspherical lenses comprising:
   a base shaft having a circular cross-section and a central axis perpendicular to said cross-section;
   means for mounting an aspherical lens on said base shaft so that the center of the reference curvature radius of said lens lies on said central axis;
   a rotary table having a center of rotation lying on said central axis and completely surrounding said base shaft and spaced from said base shaft for relative rotation therebetween by a compressed air bearing;
   a stylus;
   means for mounting said stylus on said rotary table to cause said stylus to contact a surface of said aspherical lens as said rotary table rotates;
   means for measuring the relative rotational position between said rotary table and said base shaft; and
   laser interference measuring means for measuring the radial position of said stylus, said measuring means mounted for rotation with said stylus.

2. Apparatus as in claim 1 wherein said rotational position measuring means includes means for reading marking disposed on said rotary table.

3. Apparatus as in claim 1 wherein said base shaft, rotary table and stylus mounting means cooperate to cause said stylus to rotate in a horizontal plane.

4. A method of testing an aspherical lens, comprising the steps of:
   mounting said lens on a rotatable base shaft having a circular cross-section and a central axis perpendicular to said cross-section such that the center of the reference curvature radius of said lens lies along said central axis;
   rotating a stylus attached to a rotary table having a center of rotation along said central axis and completely surrounding said base shaft and spaced therefrom by a compressed air bearing;
   maintaining said stylus in contact with a surface of said lens;
   measuring the relative rotational position between said stylus and said base shaft; and simultaneously measuring the radial position of said stylus.

5. A method as in claim 4 wherein said rotational position measuring step includes the step of reading markings on said rotary table.

6. A method as in claim 4 wherein said rotating step includes the step of rotating said stylus in a horizontal plane.

* * * * *